Oct. 10, 1961 — J. B. TOOMEY — 3,003,721
PARACHUTE
Filed March 3, 1960 — 3 Sheets-Sheet 1
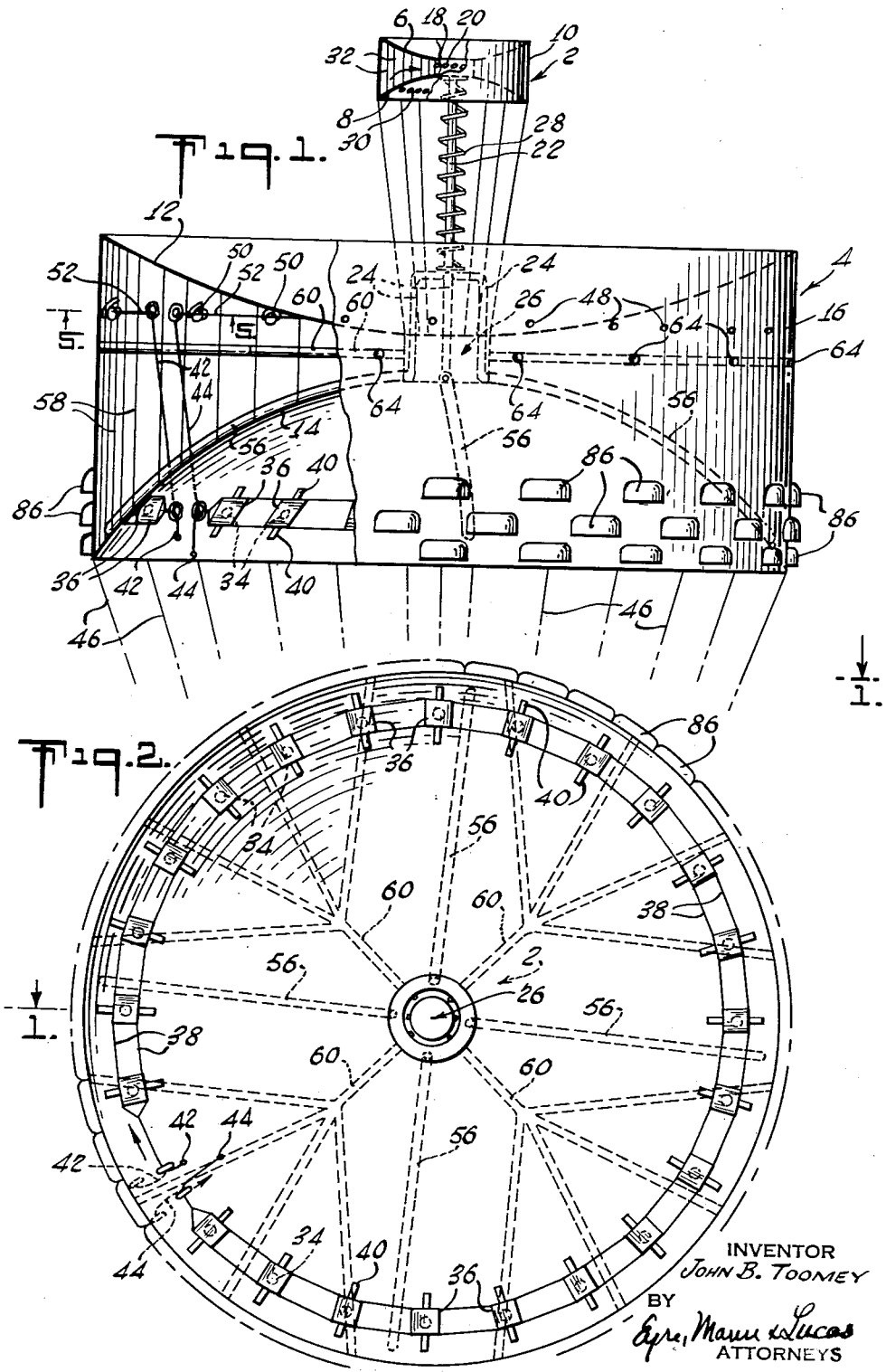
INVENTOR
JOHN B. TOOMEY
BY
ATTORNEYS

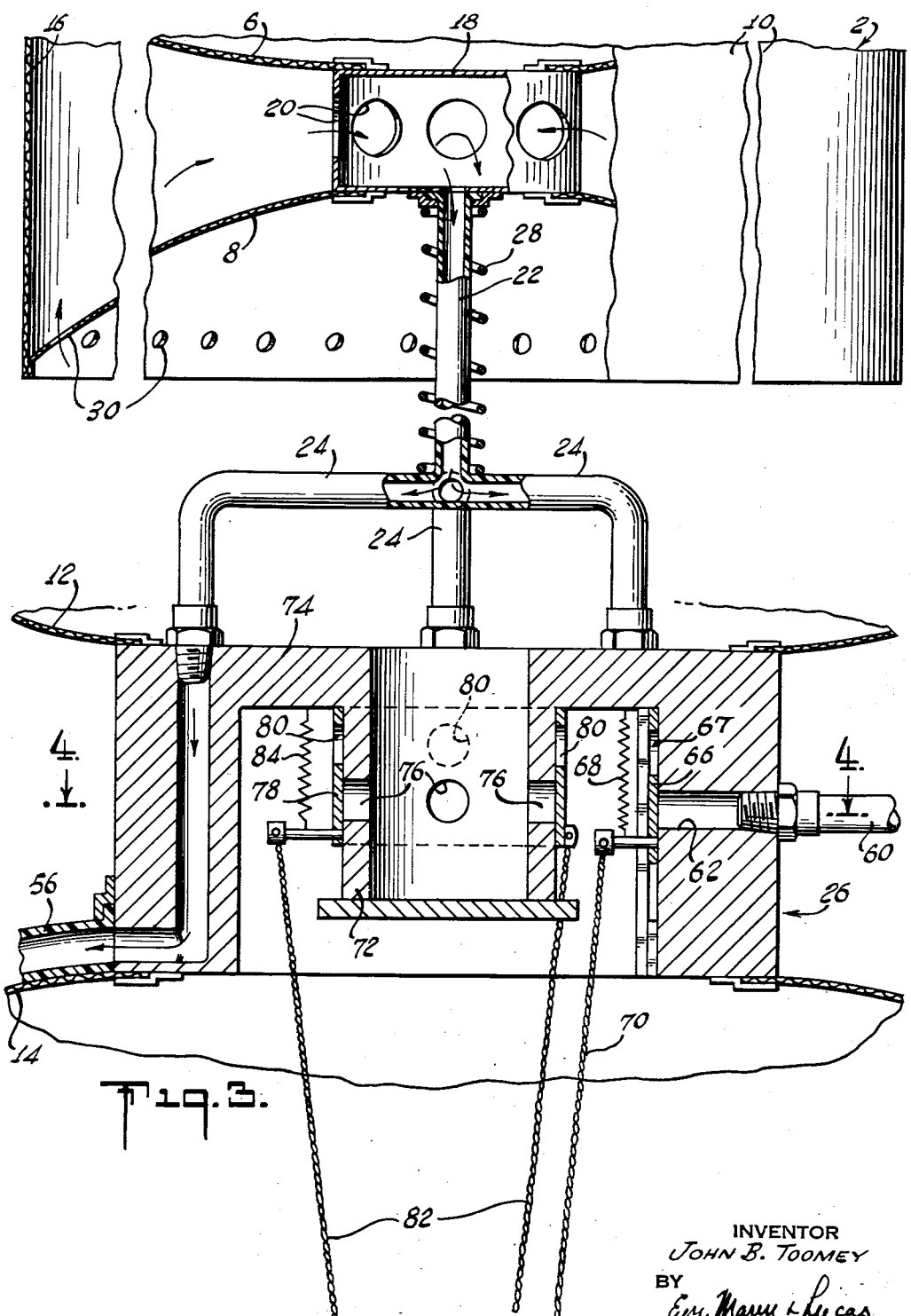

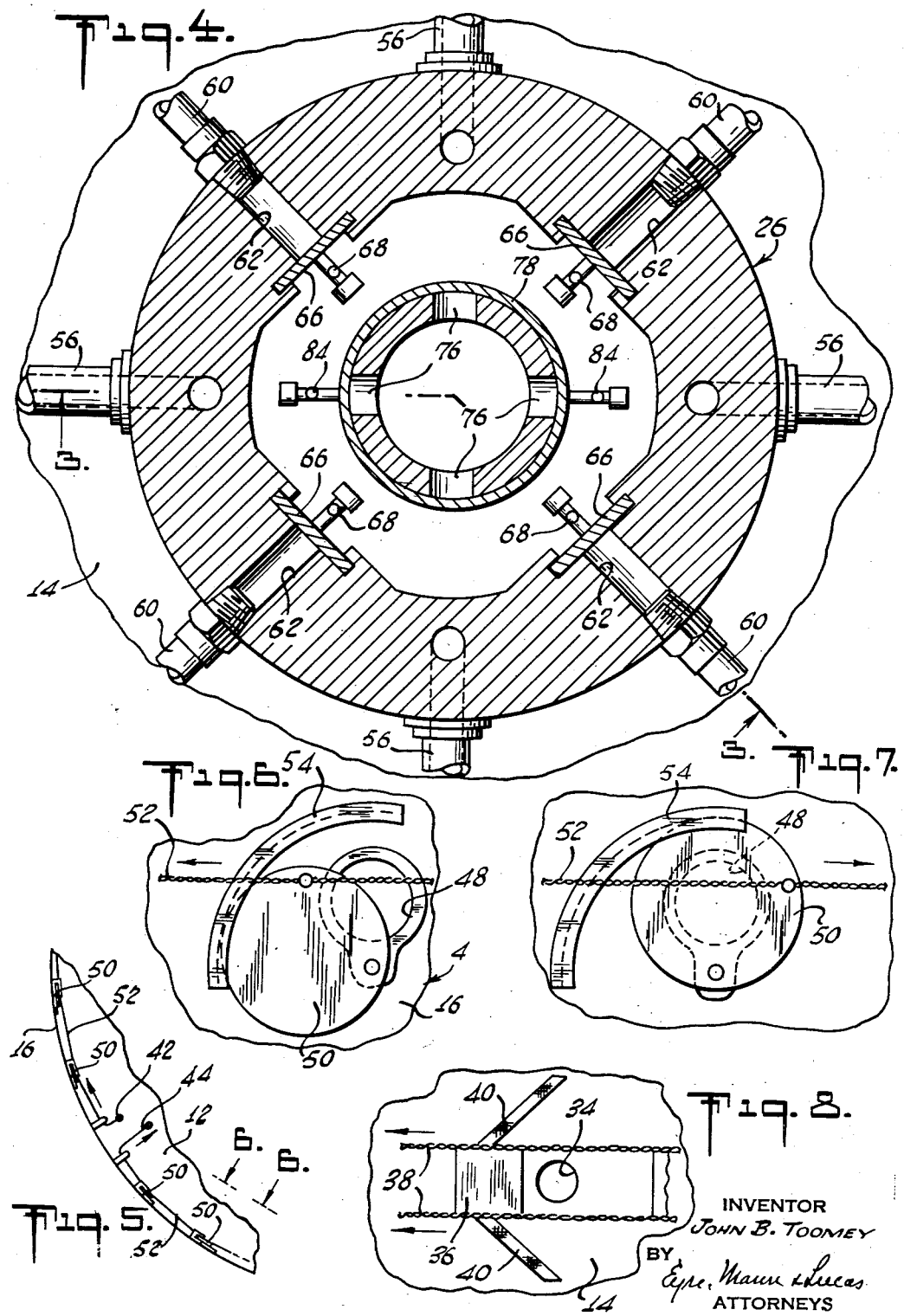

United States Patent Office 3,003,721
Patented Oct. 10, 1961

3,003,721
PARACHUTE
John B. Toomey, 330 W. 23rd St., New York, N.Y.
Filed Mar. 3, 1960, Ser. No. 12,625
6 Claims. (Cl. 244—142)

The present invention comprises a novel construction of parachute which, as compared to parachutes presently in use or heretofore proposed, has greater buoyancy and improved stability. The invention may be embodied in parachutes for descent from aircraft of cargo, or of an individual or the invention may be embodied in a pilot parachute for opening a main parachute, whether or not of the new construction, or in an accessory inflatable parachute for easing landing shock.

The new parachute comprises upper and lower flexible walls that are concave outward and are joined at the axis of the parachute and a generally cylindrical flexible wall portion which encloses the annular space between the upper and lower walls.

Because of the above briefly described configuration, air compressed by the lower wall during descent of the parachute and spilling out from under such wall will flow vertically along the cylindrical wall but will not flow over the upper wall surface. Hence a low pressure region develops over such upper wall surface which tends to retard the descent of the parachute. The annular space between the upper and lower walls, during operation of the parachute, is filled with air which rushes through openings suitably positioned about the periphery of the under wall.

In the preferred embodiment of the invention a pilot parachute is provided which, upon opening, delivers air under pressure to ribs on the inside surface of the lower wall of the main parachute to cause opening thereof and means are provided at the junction of the upper and lower walls of the main parachute for providing stabilization and directional control of the main parachute. Preferably means are provided also for control of inflation and deflation of the main parachute.

For a better understanding of the invention and of specific embodiments thereof reference may be had to the accompanying drawings of which:

FIG. 1 is a side view, partly in section, of a main parachute and pilot parachute, the parachutes being shown in open position, the view of the main parachute being taken along the line 1—1 of FIG. 2;

FIG. 2 is a horizontal sectional view through the main parachute of FIG. 1;

FIG. 3 is an enlarged sectional view through the valve means at the axis of the main parachute and showing the connections to the pilot parachute, the view being taken on the line 3—3 of FIG. 4;

FIG. 4 is a horizontal sectional view taken on the line 4—4 of FIG. 3;

FIG. 5 is a detailed view through the deflation ports of the main parachute and taken on the line 5—5 of FIG. 1;

FIG. 6 is an enlarged detail view of one of the deflation ports taken on the line 6—6 of FIG. 5 with the port shown in open position;

FIG. 7 is a view similar to FIG. 6 but showing the deflation port closed; and

FIG. 8 is an enlarged detail view of the means for controlling inflation of the main parachute.

In FIG. 1 a pilot parachute is indicated at 2 and the main parachute at 4. The pilot parachute has an upper outwardly concave wall 6 and a lower outwardly concave wall 8, the peripheries of which are joined by a cylindrical wall 10. Similarly the main parachute has an upper outwardly concave wall 12, a lower outwardly concave wall 14 and a cylindrical wall 16 joining the peripheries of the upper and lower walls. The radius of curvature of the lower wall of both the pilot parachute and the main parachute is preferably smaller than the radius of curvature of the upper concave wall, as such an arrangement reduces the height of the parachute while maintaining the full advantage of the upper concave wall heretofore described.

Axially disposed in the pilot parachute 2 is a cylindrical casing 18 which is provided about its periphery with a plurality of ports 20 and which is connected by a tube 22 to a plurality of pipes 24 coupled to valve means 26 of the main parachute and later to be described. The tube 22 may be of rubber or other strong but flexible material and is surrounded by a compression spring 28 which serves, when the main and pilot parachutes are packed, for ejection of the pilot parachute upon suitable release by the parachutist. Adjacent the periphery of the wall 8 of the pilot parachute are a plurality of openings 30 through which air enters the annular chamber defined by the wall 10 and walls 6 and 8. Air from this annular chamber enters the ports 20 in the casing element 18 and passes downwardly through the tube 22 to the pipes 24. Within the annular chamber of the pilot parachute are a number of vertical threads or cords 32 which are secured at their ends to the walls 6 and 8 and which upon inflation of the pilot parachute, insure maintenance of the shape of the upper and lower concave walls.

The construction of the main parachute 4 may be substantially identical with the pilot parachute as above described. Preferably however, the main parachute is so constructed as to provide for directional control and for control of deflation should it be desired to speed up the descent of the parachute. A main parachute of such preferred construction is shown in the drawings. In the illustrated main parachute there are a plurality of ports 34 adjacent the periphery of the wall 14 which, like the ports 30 in the pilot parachute, permit air to enter into the annular space between the upper and lower walls of the parachute. Associated with each port 34 of the main parachute is a closure plate 36 (see FIG. 8) which is mounted between a pair of cords 38 and secured by elastic strips 40 to fixed points on the outer surface of wall 14. The cords 38 extend about the periphery of the surface 14 and are connected at their opposite ends to cables 42 and 44 which pass down along the shroud lines 46 to the parachutist. Thus when cable 44 is pulled to move the cords 38 in one direction, that shown by the arrows in FIG. 8, each closure plate 36 is moved away from the associated port 34, the strips 40 stretching sufficiently to permit such movement of the plate to open position. When the cable 42 is pulled to reverse movement of the cord 38 the ports 34 are covered by the closure plates 36. Closure of the ports 34 prevents introduction of air into the annular space. If it is desired to simultaneously reduce the pressure that is built up in the annular space between the walls of the parachute, a plurality of additional ports 48 are provided in the cylindrical wall (see FIGS. 1, 5, 6 and 7). These ports are normally closed by pivoted closure plates 50. A cord 52 one end of which is connected to the cable 42 and the other end of which is connected to the cable 44, is secured to each of the plates 50. Each plate 50 is pivotally mounted below its associated port 48 and moves in an arcuate track 54 which, when the cord 52 is pulled in one direction, for example to the left as shown in FIG. 6, guides the plate into a position to open the associated port 48 and when the cord 52 is pulled in the opposite direction guides the plate 50 into position to close the associated port 48. Accordingly when cable 42 is pulled to close the ports 34 cord 52 is simultaneously moved in a direction to open the ports 48 thereby releasing air from the annular chamber and accelerating descent of the parachute.

As heretofore indicated the tube 22 from the pilot parachute connects with pipes 24 coupled to the central valve means 26 of the main parachute. These pipes 24, of which there may be four in number, connect through the wall of the valve means 26 with channels 56 which are closed at their outer ends and which are secured along the inner surface of the lower wall 14 of the parachute and form ribs for initial opening of the main parachute. Once the main parachute has opened air rushes in through the normally opened ports 34 to inflate the main parachute by build up of pressure within the annular chamber. As in the case of the pilot parachute threads or cords 58 are provided for connecting the walls 12 and 14 to insure that the parachute will maintain its configuration when inflated.

Directional control is provided in the particular parachute illustrated in the drawings by means of branched flexible pipes 60 which radiate out from valve controlled ports 62 in the valve means 26. The outer ends of the branches of the pipes 60 terminate at ports 64 in the wall 16. A slide valve 66 having an opening 67 and biased by a spring 68 to closed position, is provided for each port 62 in the valve means 26, thus normally preventing air under pressure below the lower wall 14 from entering a pipe 60. A cable 70 coupled to each slide valve 66 and passing down within a shroud line to the parachutist is provided for moving the slide valve 66 into position to bring opening 67 into alignment with the associated port against the bias of the spring 68. In the particular parachute illustrated in the drawings four such slide valve controlled ports are provided. Thus the operator can selectively control entry of air below surface 14 into any one or more of the four branched pipes 60 to cause air to issue from certain ones of the ports 64 and thereby provide a directional flow of air which will cause the parachute to move laterally in a desired direction.

Also provided within the valve means 26 are means for permitting air from below surface 14 to pass upwardly through the valve means for increasing stability of the parachute during descent. These means comprise a cylindrical member 72 closed at its lower end and secured about its upper periphery to the annular central section 74 of the valve means 26 or formed integral therewith. In the side walls of the member 72 are four ports 76 each of which is normally closed by a sleeve 78 slidably mounted about the casing 72 and provided with openings 80 which register with the ports 76 when the sleeve is moved downwardly under the influence of cords 82. The cords 82, like the cords 70 and cables 42 and 44 extend downwardly within the shroud lines for control by an operator. The sleeve 78 is normally biased to the port closing position by tension springs 84.

Preferably, as shown in FIG. 1, the outer surface of the cylindrical wall 16 is provided with a plurality of pockets or flaps 86 which open downwardly and add to the buoyancy of the parachute by entrapment of air flowing upwardly about the wall 16 during descent.

The operation of the above described parachute will be clear from the foregoing description of the specific embodiment illustrated in the drawings. It will be understood that the materials employed in the walls will be of flexible sheet material that is substantially impervious to air. The main parachute and pilot parachute, as in usual practice, will be foldable within a suitable relatively small pack with the spring 28 about the tube to the pilot parachute compressed and released upon opening of the pack. When the spring is released the pilot parachute is ejected from the pack and the descent of the parachutist causes air to rush in through the ports 30 to open the pilot parachute. Air under pressure from the annular chamber of the pilot parachute passes down through the tube 22 and into the ribs 56 of the main parachute which has been drawn from the pack by the inflation of the small parachute. Inflation of the ribs 56 causes opening of the main parachute. When the operator opens the ports 34, to decrease rate of descent air enters through the ports 34 and inflates the main parachute. Pressure within the annular chamber of the main parachute will build up rapidly as there is no means of egress from the chamber. Air can not escape through the normally closed ports 48 in the absence of positive action on the part of the parachutist to increase the rate of descent of the parachute. The pressure within the chamber acting upon the pivoted plates 50 insures tight closure of the ports 48 unless the cord 52 is pulled to move the plates into port opening position. As the closure means both for the stabilizing ports 76 of the valve means and of the directional ports 62 of the valve means are controlled by slide valves the parachutist does not have to work against the pressure below the wall 14 when opening or closing these ports.

From the foregoing description it will be apparent that the new parachute construction, irrespective of the specific control means heretofore described, has increased buoyancy as compared with prior art parachutes of equal diameter and opens rapidly but smoothly thus conserving shock. This is due to the novel construction comprising the two opposed concave surfaces interconnected at their peripheries by the annular wall providing therebetween the annular chamber which, during descent, becomes filled with air under pressure. Obviously many changes could be made in the particular constructions illustrated and certain of the control means could be omitted or varied if desired. For example, where freight is to be dropped all control means could be omitted. Although specific closure means have been illustrated for the various ports in the parachute other means could be provided. Also, if desired, the ports in the lower wall surface could be omitted. Other modifications within the scope of the accompanying claims will be apparent to those skilled in the art.

The following is claimed:

1. A parachute comprising upper and lower flexible wall members interconnected at their peripheries by a flexible cylindrical wall member, said lower wall member being provided with a plurality of openings for admission, during descent, of air into the space defined by the wall members, and means including non-extensible flexible threads of different lengths connected to said upper member for maintaining said upper wall member concave upward when the parachute is inflated during descent.

2. The parachute according to claim 1 wherein said parachute is a pilot parachute for pulling a main parachute from a pack and opening the same, said pilot parachute including a member axially interconnecting said upper and lower wall members, a flexible tube extending from said member to a main parachute, and ports in said member for passage of air from the interior of the pilot parachute into said tube.

3. The parachute according to claim 1 including means for optionally closing said openings.

4. The parachute according to claim 3 wherein said interconnecting wall member is provided with a plurality of normally closed vents, said means for optionally closing said openings being operative also for opening said vents.

5. The parachute according to claim 1 including axially disposed valve means interconnecting said upper and lower wall members, and a plurality of tubular elements extending from said valve means and terminating at open ports in said cylindrical wall member, said valve means including means for selectively controlling passage of air through said tubular elements for directional control of the parachute.

6. The combination with the parachute according to claim 1 of a small pilot parachute also comprising upper and lower flexible wall members which when the parachute is open are outwardly concave and a flexible wall member interconnecting the peripheries of said upper and lower wall members and defining therewith an annular chamber, the lower wall of the pilot parachute having openings therethrough, a member axially disposed in said pilot parachute in said chamber and having ports therein opening into said chamber, inflatable ribs secured to the inner surface of the lower wall member of said first parachute and a flexible tube connecting said ribs through said axially disposed member of the pilot parachute with the ports opening into the annular chamber of the pilot parachute.

References Cited in the file of this patent

UNITED STATES PATENTS

| | | |
|---|---|---|
| 1,328,848 | Ramauge | Jan. 27, 1920 |
| 1,810,488 | Lehmann | June 16, 1931 |
| 1,872,705 | Elliott | Aug. 23, 1932 |
| 1,929,005 | Rolkerr | Oct. 3, 1933 |
| 2,369,286 | De Lopez | Feb. 13, 1945 |
| 2,426,086 | Fehr | Aug. 19, 1947 |
| 2,452,783 | Nebesar | Nov. 2, 1948 |

FOREIGN PATENTS

| | | |
|---|---|---|
| 141,741 | Switzerland | Oct. 16, 1930 |
| 1,197,600 | France | June 1, 1959 |